United States Patent [19]

Matsuyama

[11] 4,208,530

[45] Jun. 17, 1980

[54] PROCESS FOR THE RECOVERY OF ATACTIC POLYMERS

[75] Inventor: Kiyoshi Matsuyama, Niihama, Japan

[73] Assignee: Sumitomo Chemical Company, Limited, Osaka, Japan

[21] Appl. No.: 973,292

[22] Filed: Dec. 26, 1978

[30] Foreign Application Priority Data

Dec. 28, 1977 [JP] Japan .............................. 52-159372
Feb. 14, 1978 [JP] Japan ................................ 53-16082

[51] Int. Cl.$^2$ .............................................. C08F 6/26
[52] U.S. Cl. ................................. 528/501; 528/494; 528/495; 528/496; 528/497; 528/498
[58] Field of Search ............... 528/494, 501, 495, 496, 528/497, 498

[56] References Cited

U.S. PATENT DOCUMENTS 3,644,583  2/1972  Scoggin ............................ 260/878 B

FOREIGN PATENT DOCUMENTS 52-5881  1/1977  Japan .

*Primary Examiner*—Stanford M. Levin
*Attorney, Agent, or Firm*—Sughrue, Rothwell, Mion, Zinn and Macpeak

[57] ABSTRACT

In a process for the recovery of an atactic polymer which comprises heating liquid propylene containing the dissolved atactic polymer at a gauge pressure of 13 to 40 kg/cm$^2$ in a vaporizer to vaporize the propylene, and separating the atactic polymer from the vaporized propylene thereby recovering the polymer in a molten state, the improvement comprising maintaining the vaporization temperature of propylene at 45° C. to 90° C. and the temperature of a heating medium for the vaporizer at 60° C. to 150° C. According to this process, a long run can be used in the recovery of the atactic polymer.

12 Claims, 1 Drawing Figure

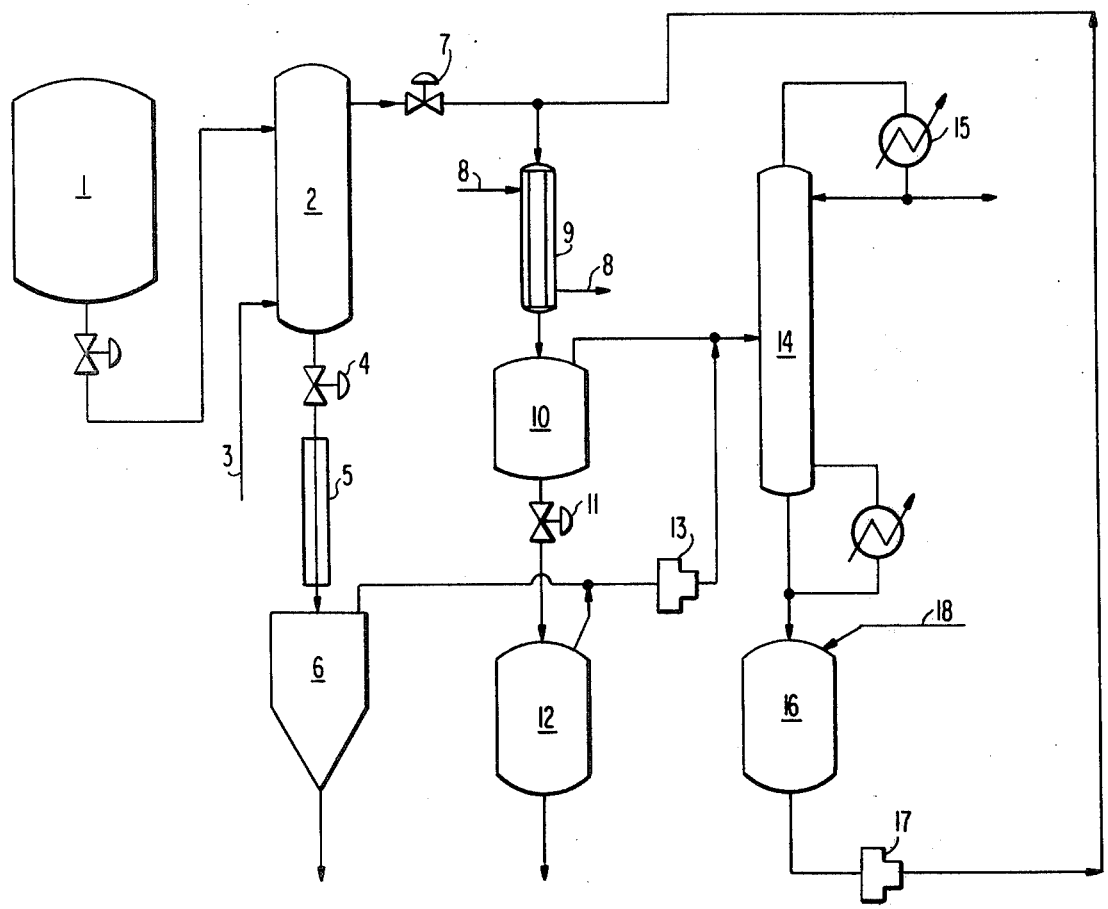

PROCESS FOR THE RECOVERY OF ATACTIC POLYMERS

BACKGROUND OF THE INVENTION

1. Field of Invention

The present invention relates to a process for the separation-recovery of propylene and the atactic polymer from liquid propylene containing the dissolved atactic polymer (hereinafter referred to as "propylene solution" for brevity).

2. Description of the Prior Art

The so-called bulk polymerization of propylene, in which homopolymerization of propylene or copolymerization of propylene with an ethylenically unsaturated hydrocarbon monomer is carried out in suspension in liquid propylene, is well known. In this polymerization, a polymer by-product (hereinafter referred to as "atactic polymer" for brevity) is obtained in a solution of liquid propylene, after separating the isotactic polymer from the polymer slurry obtained.

Of the well-known processes for the recovery of the atactic polymer, the simplest technique is to reduce the pressure on the propylene solution to a pressure near to atmospheric pressure to thereby vaporize propylene from the propylene solution. This process enables propylene to be vaporized with only slight heating, and the atactic polymer can easily be recovered. Since, however, the process involves vaporizing a large amount of liquid propylene under reduced pressure, the resulting propylene gas must be liquefied again in an industrial-scale production, to recycle it to the polymerization step. The process, therefore, requires a compressor and becomes disadvantageous in terms of large equipment and power costs.

U.S. Pat. No. 3,644,583 discloses a process which comprises vaporizing propylene under pressure to achieve the separation-recovery of the atactic polymer, but the process has the following drawbacks: (1) It is necessary to use a fractionator equipped with many sieve or bubble type fractionation trays and fine particles of the isotactic polymer and the catalyst residue can easily adhere to the trays while supplying the propylene solution containing polymer and residue to the fractionator. In addition, the separator has a complicated structure. (2) The heat transfer coefficient of the reboiler which is used for vaporization of the propylene easily drops.

Further, Japanese Patent Publication (OPI) No. 5881/1977, filed in the names of the present inventors, discloses a process which comprises heating a solution of the atactic polymer in liquid propylene under a gauge pressure of 13 to 40 kg/cm² thereby vaporizing propylene to recover the atactic polymer in a molten state. This process has the following advantages:

(1) By vaporizing the propylene under a pressure of 13 to 40 kg/cm², the separated propylene gas can be easily liquefied by merely cooling it with industrial water or air; thus a compressor for the recycle of propylene becomes unnecessary.

(2) Under high-pressure conditions, in general, the vaporization of propylene is difficult because the flash effect of propylene owing to the pressure drop cannot be obtained, and besides the heat transfer coefficient of the wall surface of a vaporizer falls due to contamination of the wall surface by the atactic polymer, and the isotactic polymer and catalyst residue of fine powder, or the vaporizer is easily blocked. In the process, however, such contamination of the vaporizer walls can be decreased by first vaporizing the propylene in a vaporizer followed by separation of the atactic polymer from propylene. In this case the inside of the vaporizer is washed with the high-speed flow of liquid propylene or propylene gas. However, a reduction in heat transfer coefficient is very large in the course of a long run.

SUMMARY OF THE INVENTION

An object of the present invention is to provide an improvement in the process described in Japanese Patent Publication (OPI) No. 5881/1977, that is, it is an object of the present invention to provide a process for the recovery of the atactic polymer which can be run for a long time.

Another object of the present invention is to provide a process for the recovery of the atactic polymer for which the run can be lengthened even further by increasing the normal feed flow of the propylene solution to the vaporizer for a very short time at regular time intervals and/or supplying a solvent to the vaporizer.

Other objects and advantages will become apparent from the following description.

The present invention is an improvement in a process for the recovery of an atactic polymer which comprises heating a liquid propylene containing the dissolved atactic polymer solution at a gauge pressure of 13 to 40 kg/cm² in a vaporizer to vaporize propylene, and separating the atactic polymer from the vaporized propylene, thereby recovering the polymer in a molten state, which comprises maintaining the vaporization temperature of the propylene at about 45° C. to 90° C. and the temperature of a heating medium for the vaporizer at about 60° C. to 150° C.

The FIGURE is a flow diagram of one example of a set up suitable for carrying out the present invention.

DETAILED DESCRIPTION OF THE INVENTION

The present invention has the advantage that the vaporization temperature is relatively low, about 45° C. to 90° C. and preferably about 55° C. to 75° C., so that the amount of propylene dissolved in the atactic polymer is increased in terms of phase equilibrium, and as a result reduction in the heat transfer coefficient of the wall surface of the vaporizer can be minimized to a large extent. In addition, the temperature of a heating medium is relatively low, about 60° C. to 150° C. and preferably about 100° C. to 120° C., so that the effective use, for example, of low-grade hot water or steam recovered from other plants is possible, and thus a large energy-savings can be obtained. Further, the easy attachment of not only the accompanying molten isotactic polymer but also catalyst residues to the wall surface of a vaporizer and decomposition of catalyst residues which leads to the generation of corrosive hydrogen chloride gas, the blackening of the catalyst residues and the blackening of the recovered atactic polymer can be avoided. Consequently, the use of expensive, anticorrosive materials and the careful maintenance of the equipment which are necessary to resist equipment corrosion are unnecessary.

In the present invention, reduction in the heat transfer coefficient of the wall surface of a vaporizer can be reduced to a large extent, as described above. Moreover, the reduction can be further minimized by, preferably, employing either of the following operations or both. One is to increase the normal feed flow of the propylene solution for a very short time from time to time during the course of the recovery-separation (hereinafter, such increased feed flow is referred to as "pulse-type feed" for brevity), and the other is to supply a solvent to the feed flow of propylene solution.

In the former case, it is preferred that the amount of the pulse-type feed is 1.1 times or more based on the mean feed flow of the propylene solution, and that the duration of the pulse-type feed is for 0.5 to 5 seconds at intervals of 5 minutes to 12 hours. The upper limit for the amount of the pulse-type feed depends upon the pressure loss in the vaporizer. However, the amount of the pulse-type feed is preferably up to about 10 times the mean flow, more preferably 1.3 to 3 times, based on the mean feed flow of the propylene solution. It is also desirable to regulate the time interval depending upon the rate at which the heat transfer coefficient drops. By this method, the attachment of the atactic polymer, catalyst residues, etc. to the wall surface of the vaporizer can be efficiently prevented. In the case of a long run, it is desirable to stop the feed flow of the propylene solution to the vaporizer before giving the pulse-type feed.

In the latter case, the solvent is preferably a hydrocarbon having 4 or more carbon atoms, preferably up to 15 carbon atoms, e.g., alcohols, alkylene oxides or mixtures thereof. The hydrocarbons having 4 or more carbon atoms include saturated or unsaturated aliphatic hydrocarbons, alicyclic hydrocarbons and aromatic hydrocarbons. Specifically, there may be named butane, pentane, hexane, heptane, 1-butene, cyclohexane, naphthene, benzene, toluene, xylene and the like. The alcohols include those having 1 to 8 carbon atoms, and specifically methanol, ethanol, isobutanol, 2-ethylhexanol and the like are suitable. The alkylene oxides include ethylene oxide, propylene oxide and the like.

The feed flow of the solvent is preferably 1 to 20% by weight, more preferably 2 to 5% by weight, based on that of the propylene solution. By this method, a reduction in the heat transfer coefficient at the wall surface of vaporizer can be prevented more efficiently. The reduction can be prevented to even a greater extent by applying both of the foregoing methods at the same time.

BRIEF DESCRIPTION OF THE DRAWING

The present invention will be illustrated in more detail by reference to the drawing. In the drawing, 1 is the final step of polymerization in which the homopolymerization or copolymerization of propylene is carried out in liquid propylene, 2 is a tower, 3 is a feed line for fresh liquid propylene, 4 is a pressure reducing valve, 5 is a heating pipe, 6 is a separator, 7 is a pressure controlling valve, 8 is a line for heating medium, 9 is a vaporizer, 10 is a flash tank, 11 is a pressure controlling valve, 12 is a separator, 13 is a compressor, 14 is a rectifying tower, 15 is a condenser, 16 is a tank, 17 is a pump and 18 is a feed line for solvent.

The polymerization is carried out using one or several reactors. In the final step 1 of the polymerization, a liquid propylene-insoluble isotactic polymer and a liquid propylene-soluble atactic polymer are produced. The isotactic polymer is suspended in liquid propylene to form a polymer slurry. The polymer slurry from the step 1 enters a tower 2 wherein the isotactic polymer and atactic polymer are separated.

Different structures of the tower 2 may be adopted depending upon the separation techniques. For example, batchwise, repetition techniques comprise concentrating the polymer slurry to deposit the isotactic polymer and withdrawing the supernatant liquor followed by the addition of fresh liquid propylene 3, concentration, deposition and so on. Techniques comprising continuous concentration and deposition can also be used as well as techniques comprising bringing the polymer slurry into counter-current contact with propylene 3 containing no atactic polymer. Each technique separates the polymer slurry into an isotactic polymer-containing phase and a dissolved atactic polymer-containing phase. The techniques are disclosed, for example, in U.S. Pat. Nos. 4,053,697 and 3,074,921, so that they can be applied easily. Sometimes, catalyst-deactivating agents or catalyst-decomposing agents are added in the practice of these techniques. In any case, liquid propylene containing the dissolved atactic polymer and liquid propylene containing the suspended isotactic polymer are withdrawn batchwise or continuously from the upper and lower portions, respectively, of the tower 2.

The pressure on the isotactic polymer slurry is reduced to a pressure close to atmospheric pressure by the action of a pressure reducing valve 4. The liquid propylene is completely vaporized through a heating pipe 5, and the vaporized propylene and isotactic polymer are separated from each other in a separator 6 such as a cyclone or flash hopper. This isotactic polymer has a powdery to granular form, and after being mixed with additives, it is used as a final product as it is or after a granulation step.

On the other hand, the atactic polymer-containing liquid propylene (propylene solution) is supplied to a vaporizer 9 through a pressure controlling valve 7. The concentration of atactic polymer in the propylene solution is preferably about 0.1 to 5% by weight. Vaporizers having various structures can be used, but preferred vaporizers are tubular-vaporizers equipped with a heating jacket for the passage of a heating medium at the outside. More specifically, the so-called double-tube type vaporizers comprising a single pipe surrounded by the heating jacket, or vertical multi-tube type vaporizers comprising two or more pipes put in the heating jacket, are preferred. The capacity of the vaporizer, that is, the length and inside diameter of the pipe, its number, etc., can be determined properly and easily taking into account the feed rate of the propylene solution and the like.

The vaporizer is heated to proper temperature by introducing a heating medium into the jacket through a line 8. The medium includes hot water, steam and organic heating medium (e.g., high-boiling solvents such as Dowtherm, hot oil and the like). In the practice of the present invention, the vaporization temperature is maintained at 45° C. to 90° C. and the heating medium is maintained at 60° C. to 150° C. The vaporization temperature is the temperature at outlet of the vaporizer. The feed flow to the vaporizer of the propylene solution is preferably regulated by means of a pressure controlling valve 7 so that the level of the liquid propylene in the tower 2 is substantially constant. The liquid propylene is substantially vaporized in the vaporizer 9. The pressure in the vaporizer 9 is kept in a range of 13 to 40 kg/cm$^2$ (gauge pressure), and at the same time it is generally kept to 2 to 10 kg/cm$^2$ lower than the pressure in tower 2 within the above range. In some cases, however, the pressure in the vaporizer 9 may be made higher than that in tower 2 by setting a pressure increasing pump at the outlet of tower 2.

If necessary, the aforesaid pulse-type feed of 1.1 times or more based on the mean feed rate may be accomplished by means of the pressure controlling valve 7 set at the outlet of tower 2. This operation is effective to remove attachments from the vaporizer wall surface thereby preventing a reduction in the heat transfer coefficient of the surface more efficiently. A larger pulse-type feed is more effective. When using the pulse-type feed, a part of the liquid propylene, remaining unvaporized, will be sent to a flash tank 10, but the accumulation of the liquid propylene in the flash tank 10 is not a problem because the duration of the pulse-type feed is so short that the accumulation is very small.

Further, a solvent having a higher boiling point than propylene may be supplied to the vaporizer 9 if necessary. By this method as well as the aforesaid method, a reduction in the heat transfer coefficient of the wall surface of vaporizer can be prevented more efficiently. For example, in a process involving the recovery and reuse of the solvent, it is effective to recycle the bottom liquor from a rectifying tower 14, as it is or as a mixed liquor comprising the solvent, low molecular weight polymers and a catalyst-deactivating agent or catalyst-decomposing agent recovered in a recovery tank 16, to the inlet of the tower 2 or vaporizer 9 by means of a pump 17. Of course, both methods, the pulse-type feed and the solvent supply, may be combined. In this case, a reduction in the heat transfer coefficient can be prevented even more efficiently.

The liquid propylene is substantially vaporized in the vaporizer and enters the flash tank 10 together with the remaining unvaporized propylene. In the flash tank 10, the propylene gas is separated from substances dissolved in the liquid propylene, e.g., trace amounts of the isotactic polymer, solvents used as a carrier for catalyst, catalysts such as organo-aluminum compounds and titanium compounds, low molecular weight polymers and a catalyst-deactivating agent or catalyst-decomposing agent, including the atactic polymer.

The pressure on the atactic polymer is reduced, if necessary, to about atmospheric pressure to 10 kg/cm$^2$ (gauge pressure) by means of a valve 11, and the entrained propylene is further separated in a separator 12. The recovered atactic polymer is sent to a combustion stage or fuel-production stage by means of the pressure in the separator or by a proper pump (e.g. gear pump, screw pump).

In the reuse of the propylene gas from the flash tank 10, the gas is first sent to a rectifying tower 14 in order to remove components having a higher boiling point than accompanying propylene (e.g. a part of solvents used as a carrier for the catalyst, low polymers of propylene and, when the solvent has been supplied to the vaporizer, a part or a large portion of the solvent), and then liquefied easily in a condenser 15.

The propylene from the separators 6 and 12 is pressurized by a compressor 13 if necessary and then recycled to the above step together with the propylene from the flash tank 10.

The present invention has been described above but is not limited thereto and can be properly modified within the scope of the present invention.

The present invention will be illustrated more specifically by reference to the following examples, which are not however to be interpreted as limiting.

COMPARATIVE EXAMPLE 1

Liquid propylene containing 0.6 wt% atactic polymer was supplied to the vaporizer 9 and vaporized under the following operating conditions:

| | |
|---|---|
| Heat transfer area of the vaporizer | 7.7 m$^2$ (multi-tube type; 22 tubes; inner tube diameter 15 mm) |
| Feed of liquid propylene | 1,800 kg/hr |
| Temperature of steam | 210° C. |
| Pressure in the flash tank | 19 kg/cm$^2$ (gauge pressure) |
| Vaporization temperature | 124° C. |

Vaporized propylene was sampled, and when checked with a litmus paper, it was found to be acidic indicating the generation of hydrogen chloride gas.

The atactic polymer in the flash tank 10 was sent to the separator 12, with the pressure on the polymer reduced to 0.1 kg/cm$^2$ (gauge pressure) through a pressure controlling valve 11. After propylene entrained in the polymer was further vaporized in the separator, the polymer was withdrawn. It was found that the atactic polymer had a black color and an irritating odor.

COMPARATIVE EXAMPLE 2

Liquid propylene containing the atactic polymer (the same propylene solution used in Comparative Example 1) was supplied to a single-tube type vaporizer 9 and vaporized under the following operating conditions:

| | |
|---|---|
| Heat transfer area of the vaporizer | 3.6 m$^2$ (single-type; inner tube diameter 1½inch) |
| Feed of liquid propylene | 1,600 kg/hr |
| Temperature of steam | 210° C. |
| Pressure in the flash tank | 19 kg/cm$^2$ (gauge pressure) |
| Vaporization temperature | 70° C. (constant) |

At the beginning, steam was intermittently supplied to the vaporizer through a temperature controlling valve, and the temperature of the heating jacket was 106° C., but the temperature in the heating jacket rose to 190° C. after 8 hours.

The vaporized propylene was sampled, and when checked on a litmus paper, it was initially neutral but it became slightly acidic after 8 hours.

The recovered atactic polymer had a greenish brown color and a slightly irritating odor.

EXAMPLE 1

The same vaporizer used in Comparative Example 1 was operated under the following conditions:

| | |
|---|---|
| Feed of liquid propylene (same solution as Comparative Example 1) | 2,100 kg/hr |
| Temperature of steam | 113° C. |
| Pressure in the flash tank 10 | 19 kg/cm$^2$ (gauge pressure) |
| Vaporization temperature | 60° C. |

It was found that the heat transfer coefficient of the vaporizer could be maintained at 320 Kcal/m$^2$hr°C. after 24 hours.

The atactic polymer in the flash tank 10 was sent to the separator 12, with the pressure on the polymer reduced to 0.1 kg/cm$^2$ (gauge pressure) through a pressure controlling valve 11. Propylene entrained in the polymer was further vaporized in the separator, and the polymer was withdrawn.

The atactic polymer was weighed and analyzed for composition. The result was as follows:

| Atactic polymer | 12.5 kg/hr |
|---|---|
| Isotactic polymer | 1.6 |
| Volatile matters such as solvent | 3.5 |
| Ash | 0.6 |

The atactic polymer had an intrinsic viscosity of 0.03 and a pale yellow color.

EXAMPLE 2

The same liquid propylene solution was supplied to the same vaporizer as in Comparative Example 1, and vaporized under the following operating conditions:

| Feed of liquid propylene | 1,800 kg/hr |
|---|---|
| Temperature of steam | 150° C. |
| Pressure in the flash tank | 18 kg/cm² (gauge pressure) |
| Vaporization temperature | 70° C. |

Initially, steam was intermittently supplied through a temperature controlling valve, and the temperature of the jacket was 104° C., but the temperature rose to 110° C. after 8 hours and to 150° C. after 12 hours. After further 15 hours, the vaporization temperature could not be maintained at 70° C. At that point, a pulse-type feed of the liquid propylene was applied through the controlling valve 7 under the conditions set forth below at 30 minute intervals. Thus the temperature returned to 70° C., but it could no longer be maintained at 70° C. after 46 hours.

| Pulse-type feed | about 3,600 kg/hr |
|---|---|
| Duration of the pulse-type feed | 3 seconds |
| Time interval | 30 minutes |

The vaporized propylene was neutral, and the recovered atactic polymer was of a pale yellow grease.

EXAMPLE 3

In Example 2, prior to applying the pulse-type feed, the supply of the liquid propylene was stopped for 10 seconds with the control valve for the heating medium opened to the fullest extent. Thus, the vaporization temperature was kept at 70° C. even after 48 hours, and the temperature of the jacket rose only to 110° C.

EXAMPLE 4

The same equipment was operated under the same conditions as in Comparative Example 2 except that the temperature of steam was 150° C. The steam temperature in the jacket was initially 107° C., but it gradually rose and reached 150° C. after 38 hours so that the temperature of the flash tank could not be kept at 70° C. At that point, the same pulse-type feed as in Example 2 was applied. Thus, the vaporization temperature could be kept at 70° C. although the temperature of the jacket fluctuated within the range of 106° C. to 145° C.

EXAMPLE 5

In Example 4, the recovered solvent (mainly heptane) in the tank 16 was supplied to the inlet of the vaporizer in amount of 2.6% by weight based on the liquid propylene solution. Thus, the vaporization temperature could be kept at 70° C. although the temperature of the jacket fluctuated within the range of 106° C. to 143° C.

EXAMPLE 6

In Example 5, the feed amount of the solvent was decreased to 1.5% by weight based on the liquid propylene. The vaporization temperature could be kept at approximately 70° C., although it sometimes dropped to 65° C.

EXAMPLE 7

The same equipment as in Comparative Example 2 was operated under the following conditions:

| Feed of liquid propylene | 1,500 kg/hr |
|---|---|
| Temperature of steam | 120° C. |
| Pressure in the flash tank | 17.5 kg/cm² (gauge pressure) |
| Vaporization temperature | 65° C. |

The temperature in the flash tank could be kept at 65° C. even after 48 hours.

While the invention has been described in detail and with reference to specific embodiments thereof, it will be apparent to one skilled in the art that various changes and modifications can be made therein without departing from the spirit and scope thereof.

What is claimed is:

1. In a process for the recovery of an atactic polymer which comprises heating liquid propylene containing the dissolved atactic polymer at a gauge pressure of 13 to 40 kg/cm² in a vaporizer to vaporize the propylene, and separating the atactic polymer from the vaporized propylene thereby recovering the polymer in a molten state, the improvement comprising maintaining the vaporization temperature of propylene at about 45° C. to 90° C. and the temperature of a heating medium for the vaporizer at about 60° C. to 150° C.

2. The process of claim 1, wherein said vaporizer has a tubular structure and is equipped with a heating jacket.

3. The process of claim 2, wherein the vaporizer is a single pipe surrounded by a heating jacket.

4. The process of claim 2, wherein the vaporizer is of a vertical construction composed of two or more pipes in a heating jacket.

5. The process of claim 1, wherein the feed rate to the vaporizer of said liquid propylene solution is increased to 1.1 times or more the mean feed flow of the propylene solution, for a duration of from 0.5 to 5 seconds at intervals of 5 minutes to 12 hours during the separation.

6. The process of claim 5, wherein said solution feed rate is increased at intervals regulated depending upon the rate at which the heat transfer coefficient of the vaporizer drops.

7. The process of claim 5, wherein said solution feed to the vaporizer is stopped prior to said increase.

8. The process of claim 1 or 5, wherein said liquid propylene is supplied to the vaporizer together with a solvent in an amount of 1 to 20% by weight based on the liquid propylene solution.

9. The process of claim 8, wherein said solvent is a hydrocarbon having 4 or more carbon atoms, an alcohol, an alkylene oxide or a mixture thereof.

10. The process of claim 1, wherein said vaporization temperature is about 55° C. to 75° C. and the temperature of said heating medium is about 100° C. to 120° C.

11. The process of claim 5, wherein said increased feed rate to the vaporizer of said liquid propylene solution is 1.1 to 10 times based on the mean feed flow of the propylene solution.

12. The process of claim 11, wherein said increased feed rate to the vaporizer of said liquid propylene solution is 1.3 to 3 times based on the mean feed flow of the propylene solution.

* * * * *